US012542657B2

(12) United States Patent
Dumanois

(10) Patent No.: US 12,542,657 B2
(45) Date of Patent: Feb. 3, 2026

(54) REINITIALIZATION OF AN APPLICATION SECRET BY WAY OF THE TERMINAL

(71) Applicant: ORANGE, Issy-les-Moulineaux (FR)

(72) Inventor: Antoine Dumanois, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 508 days.

(21) Appl. No.: 17/414,648

(22) PCT Filed: Dec. 9, 2019

(86) PCT No.: PCT/FR2019/052963
§ 371 (c)(1),
(2) Date: Jun. 16, 2021

(87) PCT Pub. No.: WO2020/128215
PCT Pub. Date: Jun. 25, 2020

(65) Prior Publication Data
US 2022/0052838 A1 Feb. 17, 2022

(30) Foreign Application Priority Data
Dec. 17, 2018 (FR) ..................................... 1873099

(51) Int. Cl.
*H04L 29/06* (2006.01)
*H04L 9/08* (2006.01)
(52) U.S. Cl.
CPC ............ *H04L 9/085* (2013.01); *H04L 9/0825* (2013.01); *H04L 9/0894* (2013.01)
(58) Field of Classification Search
CPC ..... H04L 9/085; H04L 9/0825; H04L 9/0894; H04L 9/0813; H04L 9/0844;
(Continued)

(56) References Cited

U.S. PATENT DOCUMENTS

2005/0289652 A1* 12/2005 Sharma ................ G06Q 20/388
726/26
2013/0139083 A1* 5/2013 Selgas ................ G06Q 30/0277
715/765
2017/0048254 A1* 2/2017 Avi-Dan ................ G06F 21/62

FOREIGN PATENT DOCUMENTS

| WO | 2015135063 A1 | 9/2015 |
| WO | 2017053577 A1 | 3/2017 |
| WO | 2018017019 A1 | 1/2018 |

OTHER PUBLICATIONS

English translation of the Written Opinion of the International Searching Authority dated Apr. 1, 2020 for corresponding International Application No. PCT/FR2019/052963, filed Dec. 9, 2019.
(Continued)

*Primary Examiner* — Joseph P Hirl
*Assistant Examiner* — Leynna Truvan
(74) *Attorney, Agent, or Firm* — David D. Brush; Westman, Champlin & Koehler, P.A.

(57) ABSTRACT

A method for reinitializing an application secret of an application executed by a terminal, the terminal including a security infrastructure to securely manage data for authenticating a user by the terminal. The application is connected to an application server. The method includes, after the user requests reinitialization of the application secret from the application, the security infrastructure receiving a request to cryptographically process a verification element by using an element for reinitializing the application secret stored beforehand in the security infrastructure; authenticating the user based on data entered by the user and authentication data stored in the security infrastructure; and if the user is authenticated; cryptographically processing the element for verifying the application secret to obtain an element for validating the reinitialization, which is sent to the application so that the application server validates the element and, (Continued)

if applicable, executes a process of reinitializing the application secret.

7 Claims, 5 Drawing Sheets

(58) Field of Classification Search
CPC ......... H04L 9/0866; H04L 9/32; H04L 12/22;
H04L 47/803; H04L 65/1063; H04L
67/10; H04L 67/2804; H04L 67/60; G06F
21/34; G06F 21/45; G06F 21/30; G06F
21/31; G06F 21/44; G06F 21/445; G06F
2211/003; G06F 2221/031; G06F
2221/0713; G04F 7/062; G04F 7/0804;
G06K 2019/06253; G06K 9/2081; H04N
21/25816; H04N 21/25866; H04N
21/25875; H04N 21/4415; H04N
21/44213; H04Q 3/54575; H04W 4/001;
H04W 4/003; H04W 4/60; H04W 12/002;
H04W 12/35; G05B 2219/24162; G05B
2219/24167; G05B 2219/25344; G05B
2219/32128; G05B 2219/32153; G05B
2219/33152; G05B 2219/34338; G06Q
20/363; G06Q 30/0257; G06Q 20/409;
G06Q 20/4093; G06V 10/235; G06V
30/1456; G07F 7/1025; G10H 2240/101;
G10H 2240/105; G10H 2240/111; G11B
20/00492; G11B 2020/1265
See application file for complete search history.

(56) References Cited

OTHER PUBLICATIONS

International Search Report dated Mar. 19, 2020 for corresponding International Application No. PCT/FR2019/052963, Dec. 9, 2019.
Written Opinion of the International Searching Authority dated Mar. 19, 2020 for corresponding International Application No. PCT/FR2019/052963, filed Dec. 9, 2019.

* cited by examiner

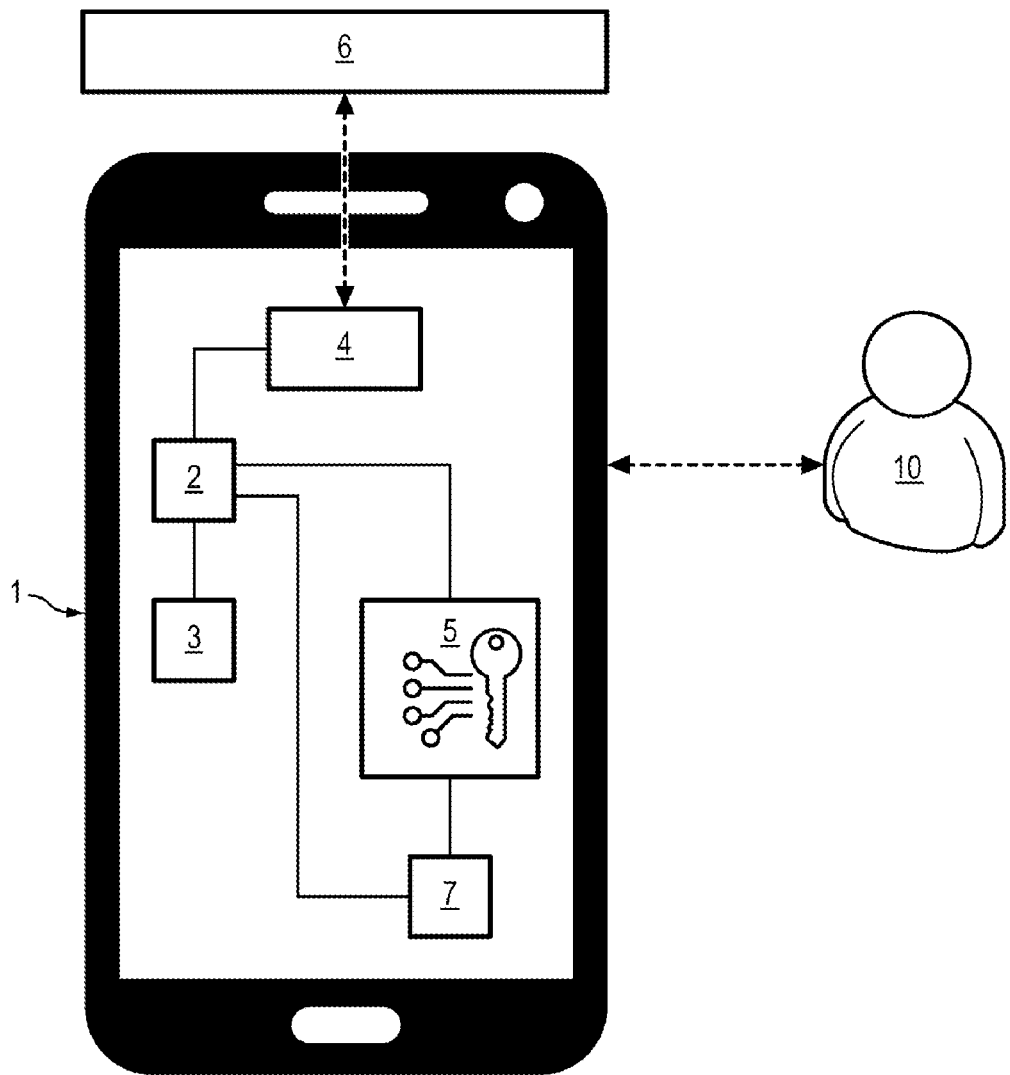
[Fig. 1]

[Fig. 2]
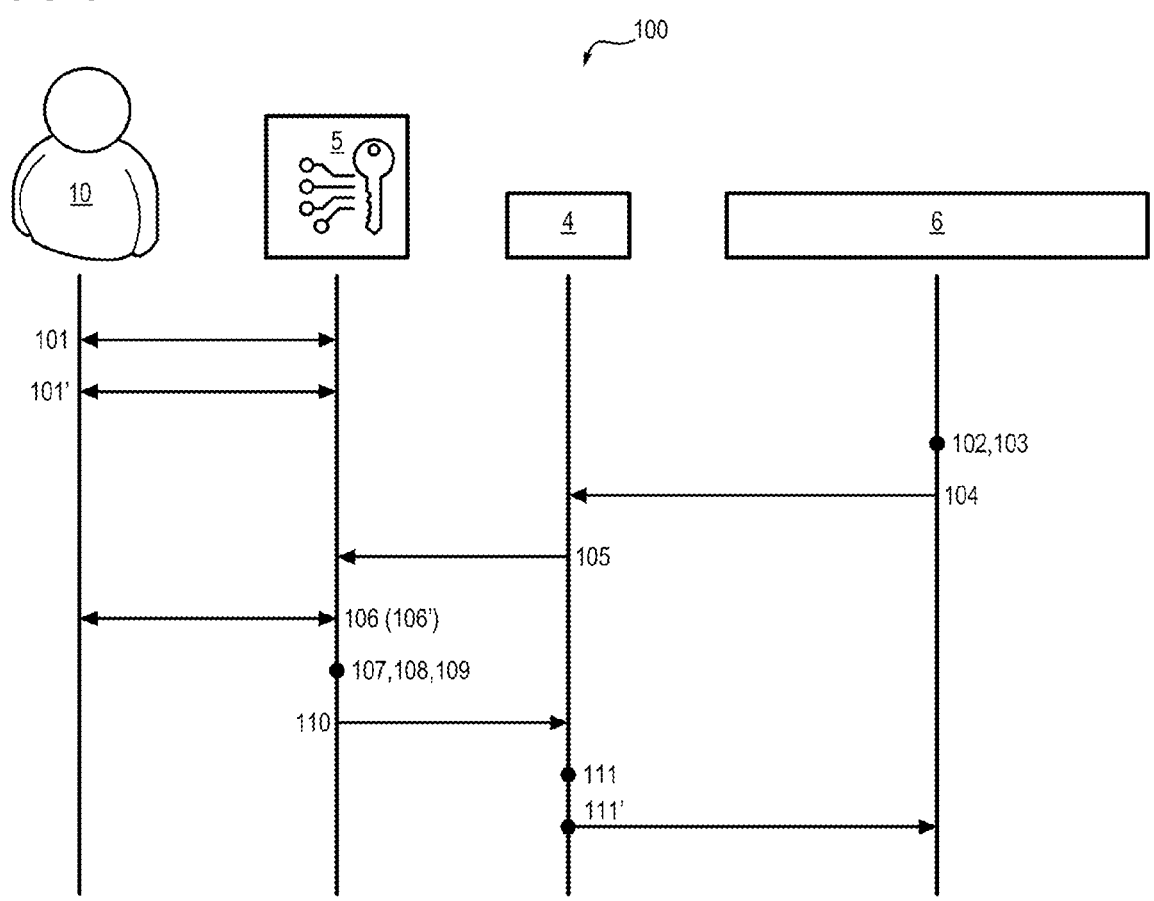

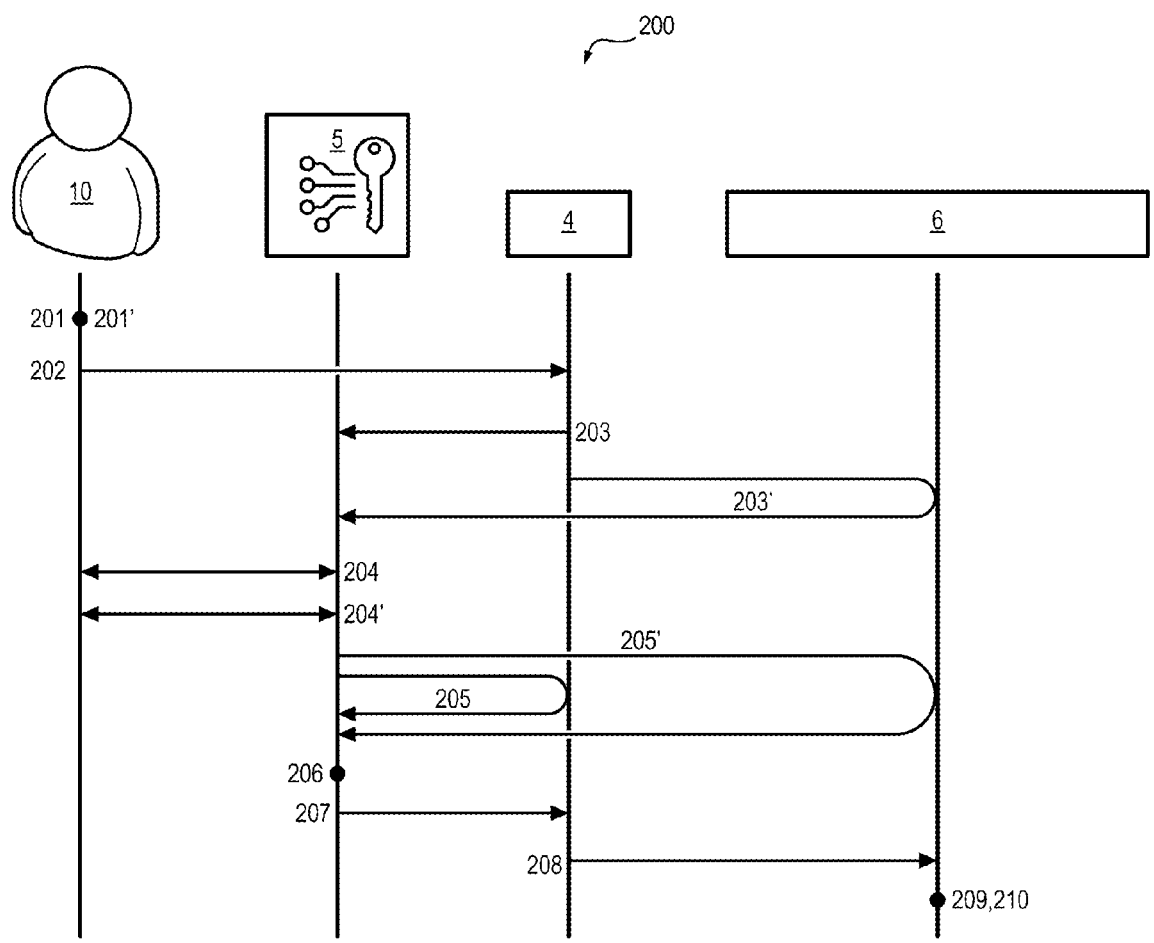
[Fig. 3]

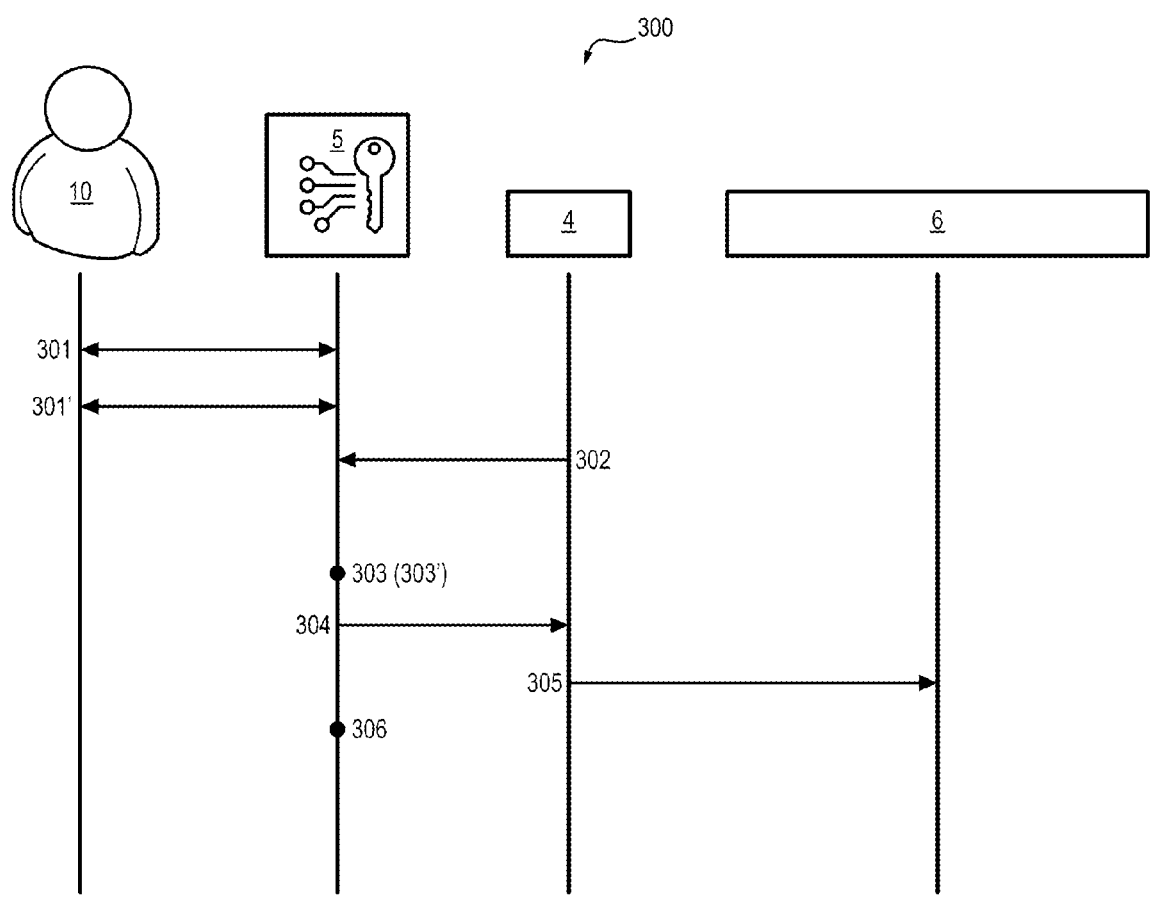
[Fig. 4]

[Fig. 5]
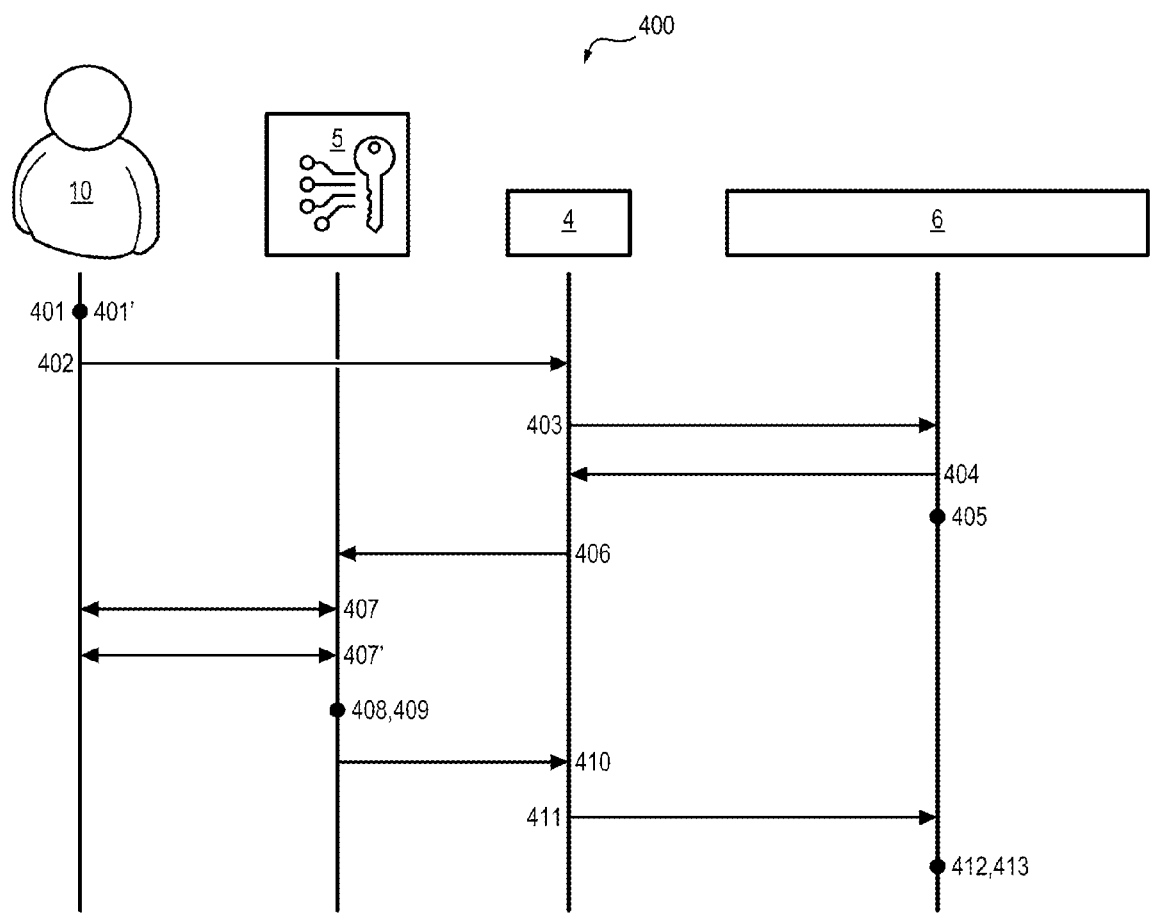

REINITIALIZATION OF AN APPLICATION SECRET BY WAY OF THE TERMINAL

CROSS-REFERENCE TO RELATED APPLICATIONS

This Application is a Section 371 National Stage Application of International Application No. PCT/FR2019/052963, filed Dec. 9, 2019, which is incorporated by reference in its entirety and published as WO 2020/128215 A1 on Jun. 25, 2020, not in English.

FIELD OF THE INVENTION

The present invention relates to the field of authenticating a user on a terminal. It relates more particularly to the resetting of the factors required to authenticate a user on an application run by a terminal.

PRIOR ART

Applications for terminals generally require users to define application secrets in order to control access thereto. These secrets are typically passwords and are sometimes lost and need to be reset.

In order to allow an application secret to be reset and to ensure the consistency of the security of the service from end to end, the applications must then use proof of identity other than the "forgotten" secret in order to accept the reset.

The techniques most commonly used today consist, when creating and registering a user account, in defining additional proof factors, often consisting of external ownership factors, such as: an email address, a phone number, secret questions, an external physical "dongle", a recovery key (complex for higher entropy).

However, these solutions are not satisfactory. Specifically, a number of limitations exist, related to ease of use (for example securely storing a complex recovery key and always having it available) or to security (for example an email address is often synchronized on the terminal on which the reset is attempted).

DISCLOSURE OF THE INVENTION

One object of the invention is to overcome the aforementioned drawbacks.

According to a first aspect, the present invention relates to a method for resetting an application secret of an application executed by a terminal, said terminal comprising a security infrastructure configured to securely manage data for authentication of a user by the terminal, the application being connected to an application server, the application secret allowing the user to authenticate themself in the application, said method comprising, after the user has requested a reset of the application secret from the application, the following steps implemented by the security infrastructure:

receiving a request for cryptographic processing of a verification element by means of a reset element for the application secret previously stored in the security infrastructure;

authenticating the user on the basis of at least one datum entered by the user and one authentication datum stored in the security infrastructure; and if the user is authenticated by the security infrastructure:

cryptographic processing of the verification element for the application secret so as to obtain a validation element for the reset;

sending, to the application, the validation element for the reset so that the application server validates the validation element for the reset and, where applicable, executes a process for resetting the application secret.

The resetting of an application secret of an application uses a reset element stored in the terminal in its secure environment. In addition, access to this reset element may be configured to require authentication of the user on the terminal running the application. Thus, the user uses the authentication on their terminal to reset the application secret. There is therefore no need for the user to give a reset element specific to the application since it uses secrets associated with the terminal already defined by the user and controlling access to its secure environment.

According to a first embodiment, the verification element is generated by the application server and provided to the terminal in advance, in anticipation of a request to reset the application secret. Thus, the verification element is a verification element that is encrypted and stored in the application server and the reset element is an encryption key stored in the security infrastructure, the processing step consisting, according to this first embodiment, in decrypting, by means of the encryption key, the encrypted verification element.

According to a second embodiment, the verification element is generated by the application server following a request to reset the application secret without being provided to the terminal in advance. Thus, the reset element is a first encryption element stored in the security infrastructure, a second encryption element being stored in the application server, the processing step consisting in signing, by means of the first encryption element, the verification element, the verification element thus signed being transmitted to the application server so that the latter verifies the validity thereof by means of the second encryption element.

According to this second embodiment, the first encryption element and the second encryption element are symmetric encryption elements of the type of public keys. As a variant, the first encryption element and the second encryption element are asymmetric encryption elements, the first encryption element preferably being a private key and the second encryption element being a public key. The choice of symmetric or asymmetric keys depends on the level of security, with asymmetric keys being more robust than symmetric keys.

Still according to the first aspect, in addition, and to increase the level of security during the authentication of the user, authentication is provided by means of an element external to the terminal. Advantageously, an external element is of the type of a "dongle" or SIM or eSIM card or eSIM profile or phone number.

According to a second aspect, the invention relates to a method for generating a reset element for an application secret of an application executed by a terminal, said terminal comprising a security infrastructure configured to securely manage and store data for authentication of the user by the terminal, the application being connected to an application server, the method comprising, the first time the application is executed, the user being authenticated in the application, the following steps implemented by the security infrastructure:

receiving a request to generate an encryption element;
generating the encryption element, said encryption element comprising at least a first portion;

storing the first portion in the security infrastructure, said first portion constituting the reset element.

The generation of a reset element is automatic and is based only on the authentication of the user. There is no need for the latter to provide an element other than an element allowing them to be authenticated on the terminal.

According to a first embodiment, the encryption element comprises a single first portion and is an encryption key, said method comprising a step of transmitting, to the application, a verification element, the generated element being an encryption key, the method comprising the encryption of the verification element, the transmission to the application, of the verification element thus encrypted which is intended to be stored.

According to this first embodiment, a verification element is defined in advance and stored in order to be used in the event of a reset of the application secret.

Advantageously, according to this first embodiment, prior to the generation of the encryption element, the method comprises a step of authenticating the user on the basis of at least one datum entered by the user and one authentication datum stored in the security infrastructure. Such authentication makes it possible to secure the access of the terminal to the security infrastructure of the terminal.

According to a second embodiment, the encryption element is a pair of encryption elements comprising a first portion and a second portion, the method comprising the transmission, to the application, of the second portion which is intended to be transmitted to the application server.

In a complementary manner, the pair of encryption elements is based on either public or private elements, again depending on the level of security required.

Thus, according to a first variant, the elements of the pair of encryption elements are asymmetric encryption elements, the first encryption element being a public key and the second encryption element being a private key, the private encryption element being stored in the security infrastructure, the public encryption element being transmitted to the application server.

According to a second variant, the elements of the pair of encryption elements are symmetric encryption elements, one of the two elements being stored in the security module, the other being transmitted to the application server.

According to either of the two variants, the reset element is an encryption element stored in the security infrastructure, and nothing is stored in the application.

According to a third aspect, the invention relates to a method for managing access to an application executed by a terminal comprising a security infrastructure configured to securely manage and store data for authentication of the user by the terminal, the application being connected to an application server and being accessible by means of an application secret capable of being reset by means of a method according to the first aspect of the invention, implementing a reset element obtained by means of a method according to the second aspect of the invention.

According to a fourth aspect, the invention relates to a security infrastructure of a terminal configured to implement a method according to the first aspect or the second aspect.

According to a fifth aspect, the invention relates to a computer program product comprising program code instructions for executing the steps of a method according to the first aspect of the invention, or to a method according to the second aspect of the invention, when this method is executed by a processor.

DESCRIPTION OF THE FIGURES

Other features, aims and advantages of the invention will become apparent from the following description, which is purely illustrative and non-limiting, and which should be read with reference to the appended drawings, in which:

FIG. 1 schematically illustrates an architecture implemented in the invention;

FIG. 2 is a flowchart of steps of a method for generating a reset element according to a first embodiment of the invention;

FIG. 3 is a flowchart of steps of a method for resetting an application secret according to a first embodiment of the invention;

FIG. 4 is a flowchart of steps of a method for generating a reset element according to a second embodiment of the invention;

FIG. 5 is a flowchart of steps of a method for resetting an application secret according to a second embodiment of the invention.

DETAILED DESCRIPTION OF THE INVENTION

With reference to FIG. 1, a terminal 1 such as a smartphone or a tablet comprises an operating system 2 executed by a processor 3 and one or more applications 4 executed by the operating system 2. The terminal 1 also comprises a user interface 7 allowing a user to cooperate with terminal 1, in particular to authenticate themself. This interface 7 is, for example, the touchscreen of the terminal or a fingerprint sensor, or a camera for implementing facial recognition. The terminal 1 further comprises a security infrastructure 5 for managing (storing in particular) various data for authentication of a user on the terminal 1. The interface 7 may be directly connected to the security infrastructure 5 and not to the operating system or to the operating system and to the security infrastructure 5 or else only to the operating system. The security infrastructure 5 may be executed as software by the processor 3 or on a portion of the processor 3 virtually isolated by hardware (see TEE architectures) or else on a dedicated isolated hardware portion. Such authentication data are, for example: a PIN code, a fingerprint, iris or facial recognition (the terminal comprising biometric sensors), a signature handwritten on a touchscreen (whether a trace made by finger or a stylus on a form), or a real signature made by finger or a stylus in a framework, voice, breathing, heartbeat, etc. recognition, or information related to the behavior of the customer (application habits, geographic habits, etc.; way in which they move their fingers on the screen or move their body, etc.), or a device, called a "dongle", to be associated with terminal 1 by means of a dedicated connector, for example a USB port. These data, although secure, are generally "reduced" i.e. transformed before storage thereof, both to facilitate the recognition process during authentication and to limit the reuse value for a hacker succeeding in having access to the stored data. It is the operating system of terminal 1 which controls access to the various elements of the terminal 1, but the element 5 can manage its own security and its own access controls. The aim is that it thus remains untouched even if the operating system 2 were to be hacked.

The application 4 is connected to a remote application server 6 or one integrated into the application 4 itself. The application 4 and the application server 6 constitute an application set. In the case where the application server 6 is remote, the application 4 communicates with the server via an Internet connection for example.

To access the application 4, the user 10 has an application secret such as a password. This password is associated with the identity of the user 10 and is created the first time the user 10 connects to the application 4.

At the same time as the user 10 creates their password for the first time, a reset element is generated (see the generation of a reset element according to a first or a second embodiment described below). This reset element allows the user 10, when they require a reset of their access to the application, to recover it. In particular, when the user has "lost" their password, such a reset of the application secret is initiated (see the reset of an application secret according to a first or a second embodiment described below). In practice, this means a request to reset the password made from the application via the terminal 1 of the user 10.

This reset element is created the first time the application is executed by the terminal 1 once the user 10 has been correctly identified on the latter. Advantageously and without limitation, the invention is based on the implementation of a reset element stored by the terminal in the security infrastructure 5 for resetting the application secret. The reset element may be generated and implemented in a number of ways as detailed below.

First Embodiment

Generating the Reset Item

A method for generating 100 a reset element according to a first embodiment is illustrated in FIG. 2.

In this first embodiment, a verification element is generated by the application server 6 and provided to a terminal 1 in advance, in anticipation of a request to reset the application secret.

The reset element is generated the first time the application is executed on the terminal 1 once the user has correctly identified themself in the application by means of the application secret (step 101).

Once the user has correctly identified themself in the application, the application server 6 generates (step 102) a verification element which is an element to be encrypted. A copy of this element to be encrypted is stored (step 103) in the application server 6 and will be used during the resetting of the application secret (as will be seen below). Once the verification element has been generated and stored, the application server 6 sends it (step 104) to the application. The application 4 then asks the security infrastructure 5 to encrypt it (step 105).

As a result of this double request, the security infrastructure 5 will have to generate, on the request of the application 4, an encryption key, the use of which requires the prior authentication of the user on their terminal. An encryption key is, for example, an AES (Advanced Encryption Standard) key which is generated in the security infrastructure 5 and never leaves it. It will be used to encrypt the reset secret and then to decrypt it.

Since the security infrastructure 5 is called upon to perform processing operations, it asks the user 10, for example by means of the interface 7, to authenticate themself (step 106). This authentication may take several forms: entering a PIN code, entering a biometric or facial scan, etc. The security infrastructure 5 will then process the authentication element used by the user 10. For example, if the user authenticates themself by entering their PIN code, the code entered by the user 10 will then be compared with the PIN code stored in the security infrastructure 5.

Once the user 10 has been correctly authenticated, the security infrastructure 5 generates the encryption key (step 107) and encrypts (step 108) the element to be encrypted which has been generated by the application server 6. Next, the generated encryption key is stored (step 109) in the security infrastructure 5 of the terminal 1 and the encrypted element is sent to the application (step 110). The application 4 or the server 6 then stores the encrypted element (step 111 or step 111').

The reset element is here an encryption key which is stored securely by the terminal 1 in the security infrastructure 5.

Resetting the Application Secret

A method for resetting 200 an application secret of an application according to the first embodiment implementing the reset element generated according to the first reset embodiment 100 is illustrated in FIG. 3.

The user 10, who may be authenticated in the application (201) or otherwise, requests, by means of the application 4, a reset of the application secret (step 202). It may also be the application 4, or the application server 6, which initiates the reset of the application secret, for example on detecting abnormal activity in the user's account.

In this case, the application 4 requires the security infrastructure 5 to decrypt an encrypted verification element, stored in the application 4 (step 203) or the server 6 (step 203'). In other words, the application 4 requires, from the security infrastructure 5, cryptographic processing of the verification element by means of the reset element generated according to the first embodiment 100. As already mentioned, given the configuration of the key, when the security infrastructure 5 is called upon, the terminal 1 will ask the user to authenticate themself.

Thus, this request triggers authentication of the user on the terminal (step 204). As above, this authentication may take several forms: entering a PIN code, entering a biometric or facial scan, etc.

Once the user 10 has been correctly authenticated, the security infrastructure 5 retrieves, from the application 4 (step 205) or the server 6 (step 205'), the encrypted verification element.

Then, using the encryption key generated when the reset element is generated, the security infrastructure 5 decrypts the verification element (step 206) and sends the verification element thus decrypted, which is a validation element for the reset, to the application 4 (step 207) which sends it to the application server 6 (step 208).

The application server 6 will then compare the decrypted verification element (i.e. the validation element for the reset) with the copy of the verification element stored during the generation of the reset element (step 209).

If it turns out that the decrypted verification element does indeed correspond to its copy stored on the server 6, then the server 6 executes a process for resetting the application secret of the application (step 210).

Such a reset process generally consists in asking the user to redefine the factor being reset from scratch. For example, for a PIN code, the user will be asked to redefine one taking into account the security constraints defined by the service. This may be done within the application or a web link may be provided to the user who updates their secret on the web interface of the service. For an external possession factor (such as a hardware key for example), the user will be asked to associate a new key with their terminal (for example mailed to the user).

On completion of this reset process, the user 10 is able to reset the application secret of the application.

Second Embodiment

Generating the Reset Item

A method for generating 300 a reset element according to a second embodiment is illustrated in FIG. 4.

Like in the first embodiment, the reset element is generated the first time the application 4 is executed on the terminal 1 once the user 10 has correctly authenticated themselves in the application 4 by means of the application secret (step 301). This authentication may take several forms: entering a PIN code, entering a biometric or facial scan. Authentication is the same regardless of the embodiment implemented.

Once the user has correctly identified themself in the application, the application 4 asks the security infrastructure 5 (step 302) to generate a pair of encryption elements.

Preferably, such a pair is a pair of asymmetric encryption elements: a first element being a public encryption element, a second element being a private encryption element.

As a variant, the pair is a pair of symmetric encryption elements: the two encryption elements are the same and both must be protected equally (concept of "secret" encryption element). As a variant, the symmetric encryption element is generated in the element 6 and provisioned in the element 5 in a secure manner (for example by means of a so-called "OTA" (over-the-air) method, i.e. a remote provisioning method.

An encryption element may be a secret, public or private encryption key, as the case may be, and potentially associated with other elements required for good protocol security (as known to those skilled in the art), such as for example a counter to prevent replay. As known to those skilled in the art, these various elements may potentially be signed in order to guarantee their origin.

The security infrastructure 5 then generates the pair of encryption elements (step 303) and transmits, to the application 4, one of the two elements (step 304), which transmits it to the application server 6 (step 305). The other element remains stored in the security infrastructure 5 of the terminal 1 (step 306).

Preferably, in the case of asymmetric encryption elements, it is the public encryption element, preferably a public encryption key, which is transmitted to the application server 6. Consequently, it is the private encryption element, preferably a private encryption key, which is stored in the security infrastructure 5 of the terminal 1.

Preferably, in the case of symmetric encryption elements, the secret key is transmitted to the application server 6 only if the confidentiality of the transfer end to end can be ensured. Alternatively, it is the server 6 which generates the key and transfers it to the security infrastructure 5 of the terminal 1.

As will be understood, in this embodiment, the reset element is an encryption element such as an encryption key and preferably a private encryption key.

Resetting the Application Secret

A method 400 for resetting an application secret of an application according to a second embodiment implementing the reset element generated according to the second reset embodiment 300 is illustrated in FIG. 5.

In this second embodiment, a verification element is generated by the application server 6 following a request to reset the application secret without being provided to the terminal 10 in advance.

As in the first embodiment, the user 10, who may be authenticated in the application 4 (step 401) or otherwise, requests, by means of the application, a reset of the application secret (step 402). It may also be the application 4, or the application server 6, which initiates the reset of the application secret, for example on detecting abnormal activity in the user's account.

The application 4 asks the application server 6 to generate a verification element (step 403). The application server 6 then sends the verification element to the application 4 (step 404). The server then stores a copy of the verification element (step 405). Alternatively, the application server 6 may keep the original and send a copy.

The application 4 then asks the security infrastructure 5 to sign the verification element (step 406) by means of the encryption element stored in the security infrastructure 5. In other words, the application 4 requires, from the security infrastructure 5, cryptographic processing of the verification element by means of the reset element generated according to the second embodiment 300.

As already mentioned, since the security infrastructure 5 is called upon, this request triggers authentication of the user 10 on the terminal 1 (step 407). As above, this authentication may take several forms: entering a PIN code, entering a biometric or facial scan, etc.

Once the user 10 has been correctly authenticated, the security infrastructure 5 accesses the encryption element (step 408) and signs the verification element by means of this encryption element (step 409).

The security infrastructure 5 then sends the signed verification element to the application 4 (step 410) which sends it to the application server 6 (step 411).

The application server 6 will then verify the validity of the cryptographic processing performed on the verification element (step 412) by means of the encryption element that it stored in step 405 in order to obtain a validation element for the reset. The validation element for the reset is here an item of information on the validity of the cryptographic processing.

If verification is successful and the verification element is indeed identical to the copy stored in the application server 6, then the latter executes a process for resetting the application secret of the application (step 413).

Such a reset process generally consists in asking the user to redefine the factor being reset from scratch. For example, for a PIN code, the user will be asked to redefine one taking into account the security constraints defined by the service. This may be done within the application or a web link may be provided to the user who updates their secret on the web interface of the service. For an external possession factor (such as a hardware key for example), the user will be asked to associate a new key with their terminal (for example mailed to the user).

On completion of this reset process, the user is able to reset the application secret of the application.

Addition to Either of the Methods Described Above

In addition to authenticating the user on the basis of a datum stored in the terminal, the application or the security infrastructure may authenticate (steps 101', 201', 301', 401', 106', 204', 407') the user by means of an element external to the terminal.

Such an external element is for example a "dongle". Another example is verifying the presence of the correct SIM card or the correct cellphone number.

In other words, in the example of the user being authenticated by means of a PIN code entered by the user, the terminal may also verify the insertion of a "dongle". In this case, the authentication is multi-factor and advantageously retains the factors other than the one being recovered during the reset phase described above.

The invention claimed is:

1. A method for resetting an application secret of an application executed by a terminal, said terminal comprising a security infrastructure configured to securely manage data for authentication of a user by the terminal, the application being connected to an application server, the application secret allowing the user to authenticate themself in the application, said method comprising:

after the user, the application or the application server has requested a reset of the application secret from the application, the following acts implemented by the security infrastructure:

receiving from the application or the application server a request for cryptographic processing of a verification element for the application secret, by using a reset element for the application secret known only to the security infrastructure and previously stored in the security infrastructure;

in response to the request for cryptographic processing, authenticating the user through an interface associated with the terminal on the basis of at least one datum entered by the user to authenticate themself on the terminal without any datum specific to the application; and in response to the user being authenticated by the security infrastructure on the basis of the at least one datum entered by the user:

cryptographic processing the verification element for the application secret by signing the verification element with the reset element known only to the security infrastructure so as to obtain a validation element for the reset; and sending, to the application, the validation element for the reset so that the application server validates the validation element for the reset using an encryption element stored in the application server and, where applicable, executes a process for resetting the application secret.

2. The method as claimed in claim 1, wherein the verification element is a verification element that is encrypted and stored in the application server, the reset element is an encryption key stored in the security infrastructure, and wherein the processing comprises decrypting, by using the encryption key, the encrypted verification element.

3. The method as claimed in claim 1, wherein the reset element and the encryption element are symmetric encryption elements of a public key type.

4. The method as claimed in claim 1, wherein the reset element and the encryption element are asymmetric encryption elements, the reset element being a private key and the encryption element being a public key.

5. The method as claimed in claim 1, further comprising authenticating the user by using an element external to the terminal.

6. A security infrastructure of a terminal, comprising:
a processor; and
a non-transitory computer-readable medium comprising instructions stored thereon which when executed by the processor configure the security infrastructure to reset an application secret of an application executed by the terminal, said security infrastructure being configured to securely manage data for authentication of a user by the terminal, the application being connected to an application server, the application secret allowing the user to authenticate themself in the application, wherein the security infrastructure resets the application secret by:

after the user, the application or the application server has requested the reset of the application secret from the application:

receiving from the application or the application server a request for cryptographic processing of a verification element for the application secret, by using a reset element for the application secret known only to the security infrastructure and previously stored in the security infrastructure;

in response to the request for cryptographic processing, authenticating the user through an interface associated with the terminal on the basis of at least one datum entered by the user to authenticate themself on the terminal without any datum specific to the application; and in response to the user being authenticated by the security infrastructure on the basis of the at least one datum entered by the user:

cryptographic processing the verification element for the application secret by signing the verification element with the reset element known only to the security infrastructure so as to obtain a validation element for the reset; and sending, to the application, the validation element for the reset so that the application server validates the validation element for the reset using an encryption element stored in the application server and, where applicable, executes a process for resetting the application secret.

7. A non-transitory computer-readable medium comprising program code instructions stored thereon for executing a method for resetting an application secret of an application executed by a terminal, when the instructions are executed by a processor, said terminal comprising a security infrastructure configured to securely manage data for authentication of a user by the terminal, the application being connected to an application server, the application secret allowing the user to authenticate themself in the application, wherein the instructions when executed by the processor configure the security infrastructure to:

implement the following acts after the user, the application or the application server has requested a reset of the application secret from the application:

receiving from the application or the application server a request for cryptographic processing of a verification element for the application secret, by using a reset element for the application secret known only to the security infrastructure and previously stored in the security infrastructure;

in response to the request for cryptographic processing, authenticating the user through an interface associated with the terminal on the basis of at least one datum entered by the user to authenticate themself on the terminal without any datum specific to the application; and in response to the user being authenticated by the security infrastructure on the basis of the at least one datum entered by the user:

cryptographic processing the verification element for the application secret by signing the verification element with the reset element known only to the security infrastructure so as to obtain a validation element for the reset; and sending, to the application, the validation element for the reset so that the application server validates the validation element for the reset using an encryption element stored in the application server and, where applicable, executes a process for resetting the application secret.

\* \* \* \* \*